US008752222B2

(12) United States Patent
Papaioannou

(10) Patent No.: US 8,752,222 B2
(45) Date of Patent: Jun. 17, 2014

(54) ADAPTABLE SURFACE FOR USE IN BEDS AND CHAIRS TO REDUCE OCCURRENCE OF PRESSURE ULCERS

(76) Inventor: George Papaioannou, Glendale, WI (US)

( * ) Notice: Subject to any disclaimer, the term of this patent is extended or adjusted under 35 U.S.C. 154(b) by 675 days.

(21) Appl. No.: 12/587,855

(22) Filed: Oct. 13, 2009

(65) Prior Publication Data

US 2010/0101026 A1     Apr. 29, 2010

Related U.S. Application Data

(60) Provisional application No. 61/104,959, filed on Oct. 13, 2008.

(51) Int. Cl.
*A47C 16/00* (2006.01)
*A47C 17/00* (2006.01)

(52) U.S. Cl.
USPC ............................ 5/657; 5/690; 5/722; 5/729

(58) Field of Classification Search
USPC ............... 5/690, 722, 727, 729, 71, 657, 933, 5/944, 731
See application file for complete search history.

(56) References Cited

U.S. PATENT DOCUMENTS

| | | | | |
|---|---|---|---|---|
| 3,656,190 A * | 4/1972 | Regan et al. | | 5/613 |
| 4,644,593 A * | 2/1987 | O'Brien | | 5/613 |
| 4,799,276 A * | 1/1989 | Kadish | | 5/613 |
| 5,060,326 A * | 10/1991 | Oswald | | 5/236.1 |
| 5,192,304 A * | 3/1993 | Rassman | | 606/238 |
| 5,283,735 A * | 2/1994 | Gross et al. | | 600/587 |
| 5,511,260 A * | 4/1996 | Dinsmoor et al. | | 5/676 |
| 5,607,749 A * | 3/1997 | Strumor | | 428/156 |
| 5,625,914 A * | 5/1997 | Schwab | | 5/690 |
| 5,963,997 A | 10/1999 | Hagopian | | |
| 5,991,949 A | 11/1999 | Miller, Sr. et al. | | |
| 6,009,580 A * | 1/2000 | Caminade et al. | | 5/713 |
| 6,499,160 B2 | 12/2002 | Hand et al. | | |
| 6,536,056 B1 | 3/2003 | Vrzalik et al. | | |
| 6,681,427 B2 * | 1/2004 | Anderson et al. | | 5/713 |
| 6,813,791 B2 * | 11/2004 | Mossbeck et al. | | 5/720 |
| 7,069,610 B1 * | 7/2006 | Chai | | 5/731 |
| 7,676,872 B2 * | 3/2010 | Block et al. | | 5/690 |
| 2006/0096029 A1 | 5/2006 | Osborne et al. | | |
| 2006/0101581 A1 | 5/2006 | Blanchard et al. | | |

OTHER PUBLICATIONS

PCT/US09/05589 International Search Report dated Jan. 11, 2010 (2 pages).

* cited by examiner

*Primary Examiner* — William Kelleher
*Assistant Examiner* — Eric Kurilla
(74) *Attorney, Agent, or Firm* — Michael Best & Friedrich LLP

(57) ABSTRACT

An adaptable surface system including a plurality of individually adjustable surface units and a plurality of pressure sensors. Each pressure sensor corresponds to one of the adjustable subsurface units and is positioned to measure an amount of pressure exerted upon the subsurface unit. The system also includes a controller that receives a first pressure value from a pressure sensor, compares the value to a threshold, and adjusts the height of the first subsurface unit based on the comparison. The controller also receives a second pressure value from a second pressure sensor, compares the second pressure value to the threshold, and adjusts the height of a second subsurface unit based on the comparison.

21 Claims, 12 Drawing Sheets

ADAPTABLE SURFACE FOR USE IN BEDS AND CHAIRS TO REDUCE OCCURRENCE OF PRESSURE ULCERS

RELATED APPLICATIONS

The present application claims priority to U.S. Provisional Application No. 61/104,959 filed on Oct. 13, 2008, the entire contents of which is incorporated herein by reference.

BACKGROUND

The present invention relates generally to the prevention of pressure ulcers caused by sitting or lying in the same position for extended periods of time. When a force is applied to an area of a person's skin for an extended period of time, local damage to the skin and its underlying tissues can result. This type of injury—commonly known as a pressure ulcer, a decubitis ulcer, or a bed sore—frequently affects persons who are confined to a therapy bed or a wheelchair. In fact, it is estimated that 85% of spinal cord injured patients that utilize a wheelchair will develop a pressure ulcer during their lifetime. Because pressure ulcers can result in serious infections—often chronic and life threatening—and can require long term nursing care or hospitalization, pressure ulcers are major medical concerns in many contexts.

SUMMARY

Embodiments of the present invention provide an adaptable surface that measures the pressure distribution between a person and the surface. The adaptable surface is able to conform to the user's unique body morphology by adapting to distribute pressure across the human-cushion interface. By so adapting, the surface reduces the pressure, increases comfort, and helps prevent skin maceration and the development of pressure ulcers.

In one embodiment, the invention provides an adaptable surface system including a plurality of individually adjustable surface units and a plurality of pressure sensors. Each pressure sensor corresponds to one of the adjustable subsurface units and is positioned to measure an amount of pressure exerted upon the subsurface unit. The system also includes a controller that receives a first pressure value from a pressure sensor, compares the value to a threshold, and adjusts the height of the first subsurface unit based on the comparison. The controller also receives a second pressure value from a second pressure sensor, compares the second pressure value to the threshold, and adjusts the height of a second subsurface unit based on the comparison.

In some embodiments, the first and second subsurface units are air cushions. In other embodiments, the first and second subsurface units include pneumatically controller pin elements. In other embodiments, the first and second subsurface units include motorized pin elements.

In some embodiments, the plurality of pressure sensors includes a pressure distribution sensor array. In other embodiments, the plurality of pressure sensors includes a plurality of individual pressure sensors.

In another embodiment, the invention provides a hospital bed that adapts to the pressure exerted upon the mattress by a subject supported by the mattress. The hospital bed includes an array of individually adjustable subsurface units and a plurality of pressure sensors positioned to measure the pressure distribution across the surface of the bed. The bed also includes a controller that receives a plurality of pressure values at regular intervals. The controller determines when a pressure value is outside of a predefined range, and adjusts the height of the subsurface units based on the determination.

Other aspects of the invention will become apparent by consideration of the detailed description and accompanying drawings.

BRIEF DESCRIPTION OF THE DRAWINGS AND APPENDICES

FIG. 10a is a side view of a two-layer adaptable surface system including a pin element layer and an air bladder layer in the bed of FIG. 8a.

FIG. 10b is a perspective view of a cushion section of the two-layer adaptable surface system of FIG. 10a.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Because the human body generally does not contain many flat surfaces, when a person sits or lies on a cushion (such as cushions in wheelchair seat, a vehicle seat, or a hospital bed), different pressures are exerted across the cushion and absorbed by different parts of the body. For example, bony prominences are subject to a relatively high pressure while pushing the cushion away from adjacent areas of the body. Therefore, the adjacent areas are subject to relatively little pressure. The systems and methods described below provide a system for adapting a surface to a body's unique geometry. A plurality of pressure sensors are positioned above a series of adjustable surface units. As described in detail below, the system monitors the pressure sensors and raises or lowers the adjustable surface units to automatically contour to the shape of a human body and thus better distribute the pressure between the human body and the cushion.

Figure 1:
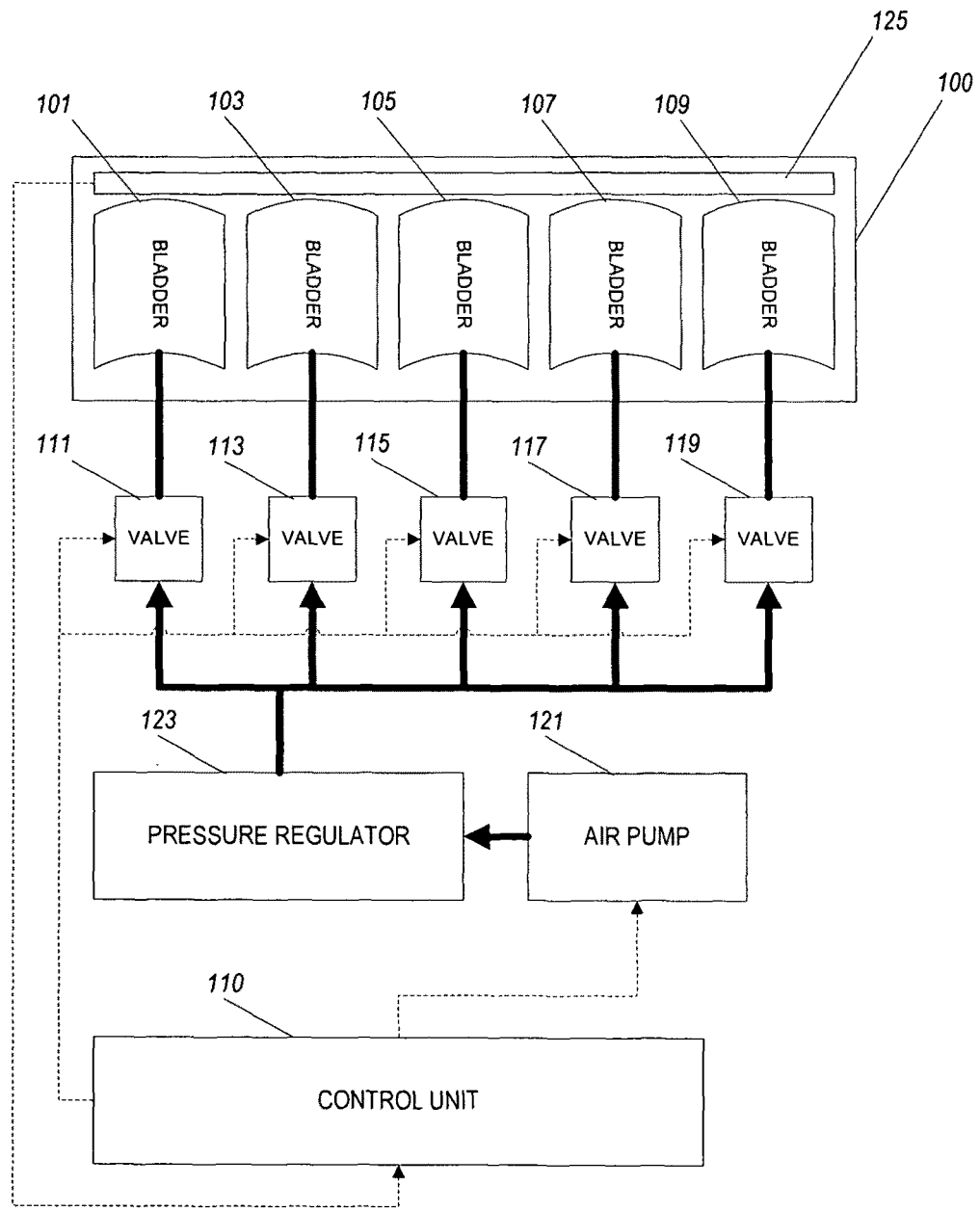
FIG. 1 is a block diagram of certain components of an adaptable surface system, including an exemplary controller or control unit, according to one embodiment.

FIG. 1 is a block diagram of an adaptable surface system according to one embodiment of the invention. In FIG. 1, the solid black line represents conduits in which pressurized air or fluid flows. The dashed lines represent data communication links between the components. Inside cushion 100 are several separate air bladders 101, 103, 104, 107, 109. Although the example illustrated in FIG. 1 includes only five air bladders, it is possible for systems to include any number of air bladders. Each bladder 101, 103, 105, 107, 109 is connected to a valve 111, 113, 115, 117, 119 which allows air to enter and to exit the air bladder. In this embodiment, each valve includes a normally closed three-port valve operated by a control unit or controller 110. In response to a signal received from the controller 110, each valve can independently open a first port that allows pressurized air provided by the air pump 121 through a pressure regulator 123 to enter into the corresponding air bladder. In response to a different signal received from the controller 110, each valve can independently open a second port that releases air from the corresponding air bladder. Pumping pressurized air into one of the bladders causes the bladder to become more firm and to increase the height of the cushion surface above the bladder, thereby increasing the amount of pressure between the cushion and a person sitting on the cushion. Releasing air from one of the bladders lowers the height of the cushion surface above the bladder, thereby reducing the amount of pressure between the cushion and the person sitting on the cushion.

Also located within the cushion 100 is an array of pressure sensors 125. In this embodiment, the array of pressure sensors is a two-dimensional pressure distribution sensor such as the Tekscan model 5315 sensor. The Tekscan pressure distribution sensor includes a series of multiple pressure sensors arranged in a two-dimensional grid. Each data point returned to the controller from the pressure distribution sensor indicates a location (on an X axis and Y axis coordinate system) and a pressure amplitude corresponding to that location. The pressure distribution sensor 125 provides the measured pressure data to the controller 110. Other arrangements of pressure sensors can also be used for the array of pressure sensors 125. For example, one or more individual pressure sensors can be positioned on top of each air bladder. Alternatively, an air pressure sensor can be incorporated into the valve to measure the air pressure within each bladder. Such sensors indirectly measure the pressure applied to the surface of the cushion 100 by measuring the air pressure within each bladder.

Figure 2:
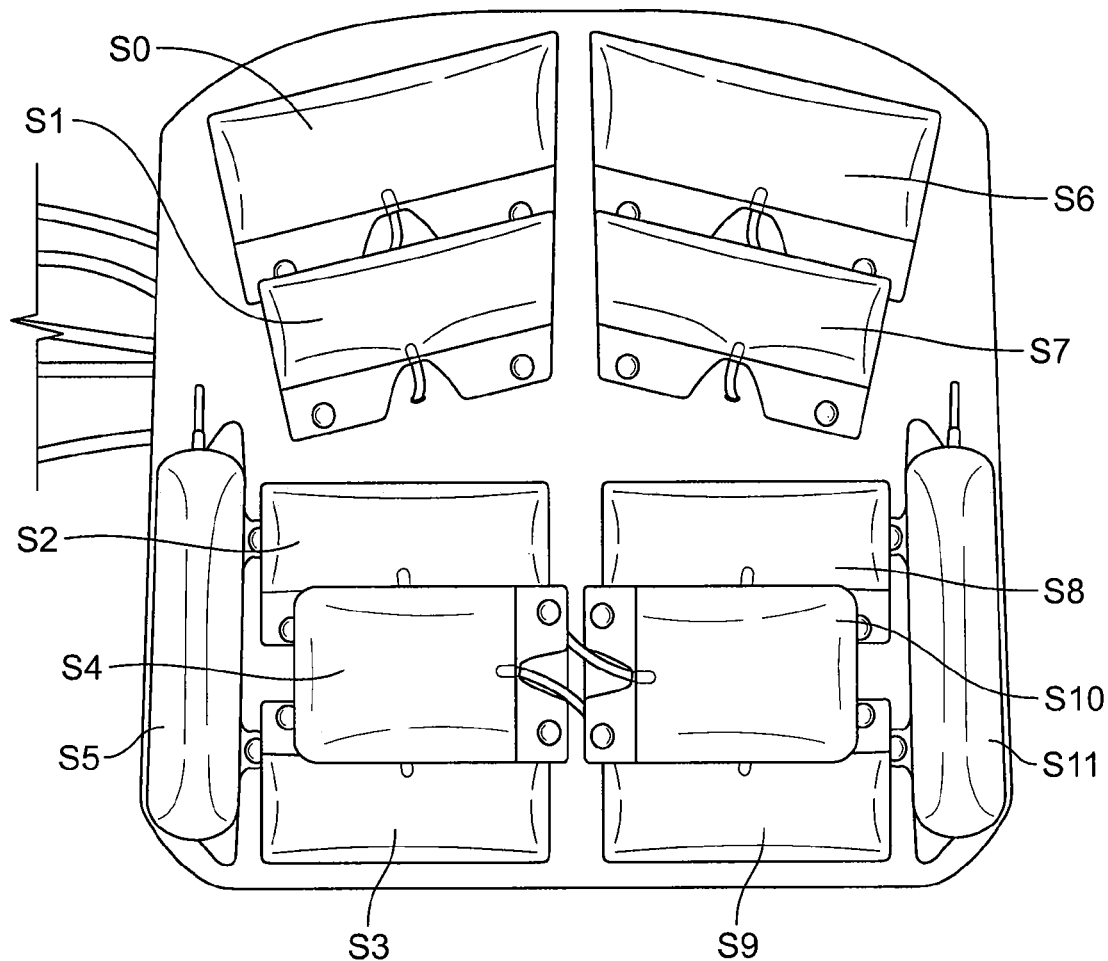
FIG. 2 is a top view of a seat cushion of the adaptable surface system shown in FIG. 1 including several adjustable air bladders.

FIG. 2 shows one possible arrangement of air bladders in a seat cushion in the system of FIG. 1. The seat cushion includes twelve independently controlled air bladders. The air bladders are arranged such that each leg is supported with two air bladders in an area corresponding to the location of the person's buttocks when seated (S0 & S1; S6 & S7), three air bladders beneath the thigh (S2, S3, & S4; S8, S9, & S10), and one bladder along the edge of the thigh (S5; S11). The air bladders are positioned above a foam layer (or other suitable vibration dampening material) and are enclosed within a fabric cover (Shown in FIG. 1) to form a lower, horizontal seat cushion. The pressure distribution sensor (not pictured in FIG. 2) is located between the air bladders and the fabric covering of the seat cushion.

As described above in reference to FIG. 1, the pressure distribution sensor 125 provides pressure distribution data to the controller 110. The controller 110 processes this data to identify areas of excessive pressure and, by controlling the valves, releases air from air bladders that correspond to those areas. Similarly, if the controller detects areas of relatively low pressure adjacent to areas of relatively high pressure, the low pressure air bladders are inflated to better distribute pressure created as a result of a person sitting or laying on the cushion.

Figure 3:
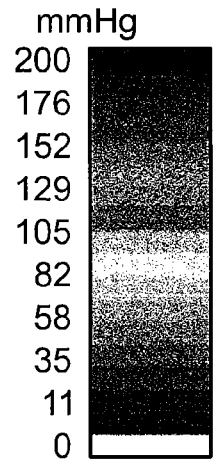
FIG. 3 is a graph of a set of pressure distribution data received from a pressure distribution sensor.
Figure 3:
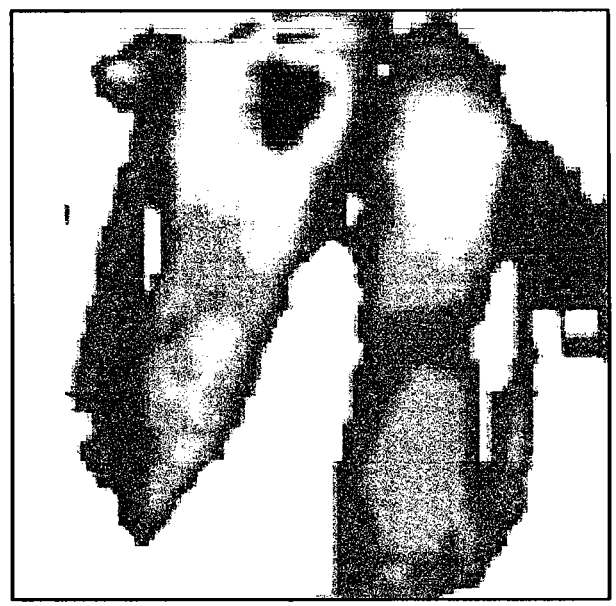

FIG. 3 is one example of data captured by the pressure sensor. The captured data indicates that a relatively high amount of pressure is measured at the user's right buttock over the air bladders S0 and S1. Additionally, a relatively low amount of pressure is measured at both of the user's upper thighs (corresponding to air bladders S3R and S3L).

Figure 4:
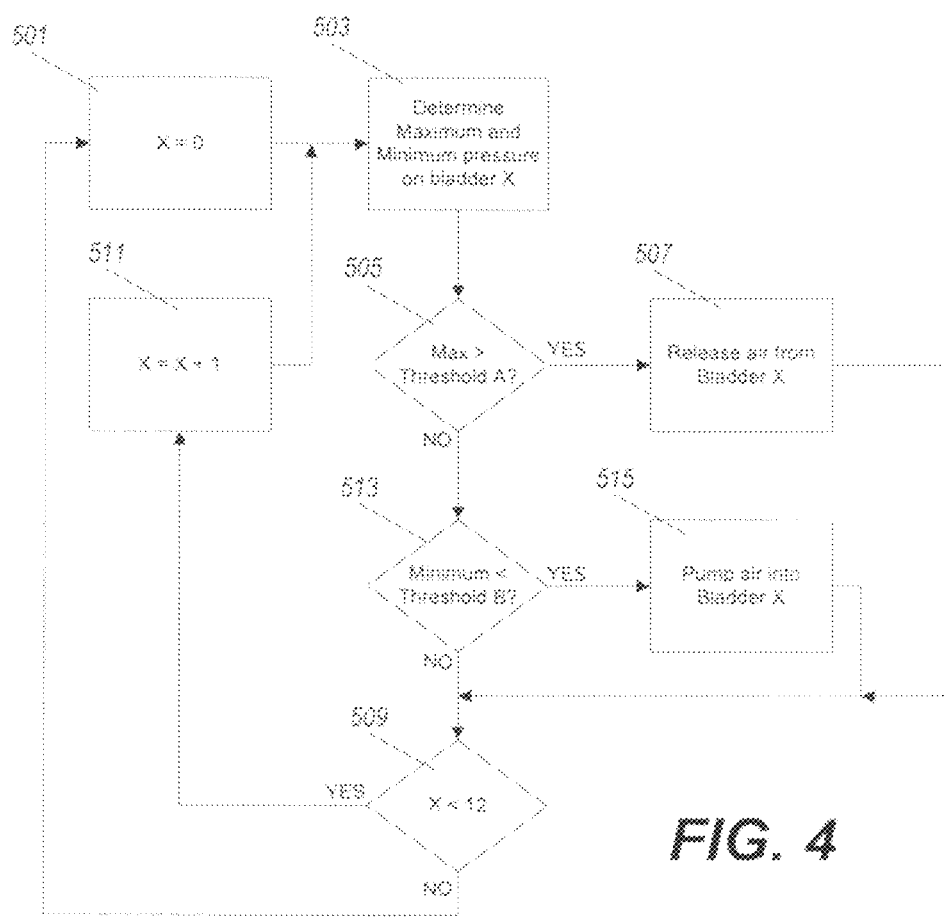
FIG. 4 is a flowchart of a process (carried out by the control unit) of adjusting the adaptable surface in response to measured pressure distribution data.

FIG. 4 illustrates one method in which the controller 110 adjusts the cushion of FIG. 2 to adapt to the pressure sensor data of FIG. 3. The controller 110 processes the pressure data corresponding to each air bladder separately. A counter is initially set to zero corresponding to air bladder S0 (step 501). The controller 110 is preprogrammed to identify a range of data points corresponding to each air bladder. The controller 110 processes the data points in the range corresponding to air bladder S0 and determines the maximum and minimum measured pressure amplitudes (step 503). The maximum measured pressure amplitude is compared to a first threshold A (step 505). If the maximum pressure exceeds this threshold (as it does in the data set of FIG. 4), the controller sends a signal to the appropriate valve to release air from air bladder S0 (step 507). As long as the counter remains less than 12 (step 509), the counter is incremented (step 511) and the controller 110 continues to process data corresponding to each separate air bladder.

The first threshold A is empirically selected such that it is lower than a pressure amplitude that could cause discomfort or a pressure ulcer. However, to prevent the system from bottoming out (i.e., releasing all of the air from every air bladder S0-S11), the controller is programmed to use a second threshold that corresponds to a minimum acceptable pressure. In the example of FIG. 4, the controller 110 will determine that minimum measured pressure from the data range corresponding to air bladder S8 (i.e., x=8) does not exceed the minimum threshold B (step 513). In response, the controller sends a signal to the valve to allow air to be pumped into air bladder S8. By adding air to air bladders with low pressure measurements and releasing air from air bladders with high pressure measurements, the controller is able to adapt the surface of the cushion to the user's unique body geometry and to better distribute the pressure between the user and the cushion. When the counter equals eleven (at step 509), the controller has processed the data for every air bladder S0-S11. The counter is reset to zero (step 501) and the controller restarts the process. The loop is repeated until all of the bladders in the cushion have been adjusted. For example, in FIG. 4, the loop continues until the counter equal eleven because there are eleven air bladders in the cushion.

Although in the method illustrated in FIG. 4, a single controller checks the pressure applied to each subcushion in the cushion unit, other embodiments can include several separate controllers. In such embodiments, each controller will monitor one or more subcushions according to the method of FIG. 4. This multiple-controller arrangement allows for faster scanning of the pressures at different sections across larger surface areas such as hospital beds.

In some embodiments, the controller 110 receives an entirely new set of pressure distribution data from the pressure sensors 125 when the counter is reset to zero and the first and second thresholds A, B are static and predetermined. However, in other embodiments, the pressure distribution sensor 125 continuously sends data to the controller 110 in real-time. Therefore, the pressure distribution data that is analyzed for air bladder Si already accounts for the change in pressure distribution caused by releasing air from air bladder S0. This allows the system to adapt to the specific body morphologies of the subject on the cushion.

In some embodiments, the controller 110 is programmed to adapt the value of thresholds A and B based on the observed pressure distribution data provided from the pressure sensor 125. In one particular embodiment, the controller 110 determines the average pressure amplitude across the surface of the entire cushion 100. The first and second thresholds are then determined by adding or subtracting a value from the average pressure amplitude. This value can either be a static offset value or can be based in part on the calculated standard deviation. Alternatively, in some embodiments, the controller 110 calculates the first and second thresholds based on the average pressure amplitude and standard deviation for only a subset of data received from the pressure distribution sensor 125. For example, if the controller is processing the data corresponding to air bladder S0, the controller uses the pressure data corresponding to all of the air bladders that directly border air bladder S0 (i.e., air bladders S1 and S6).

Additionally, in some embodiments, the amount of air released from or pumped into the air bladder (at step 507 or 515) is proportional to the difference between the maximum (or minimum) measured pressure and the first (or second) threshold A (or B).

Figure 5:
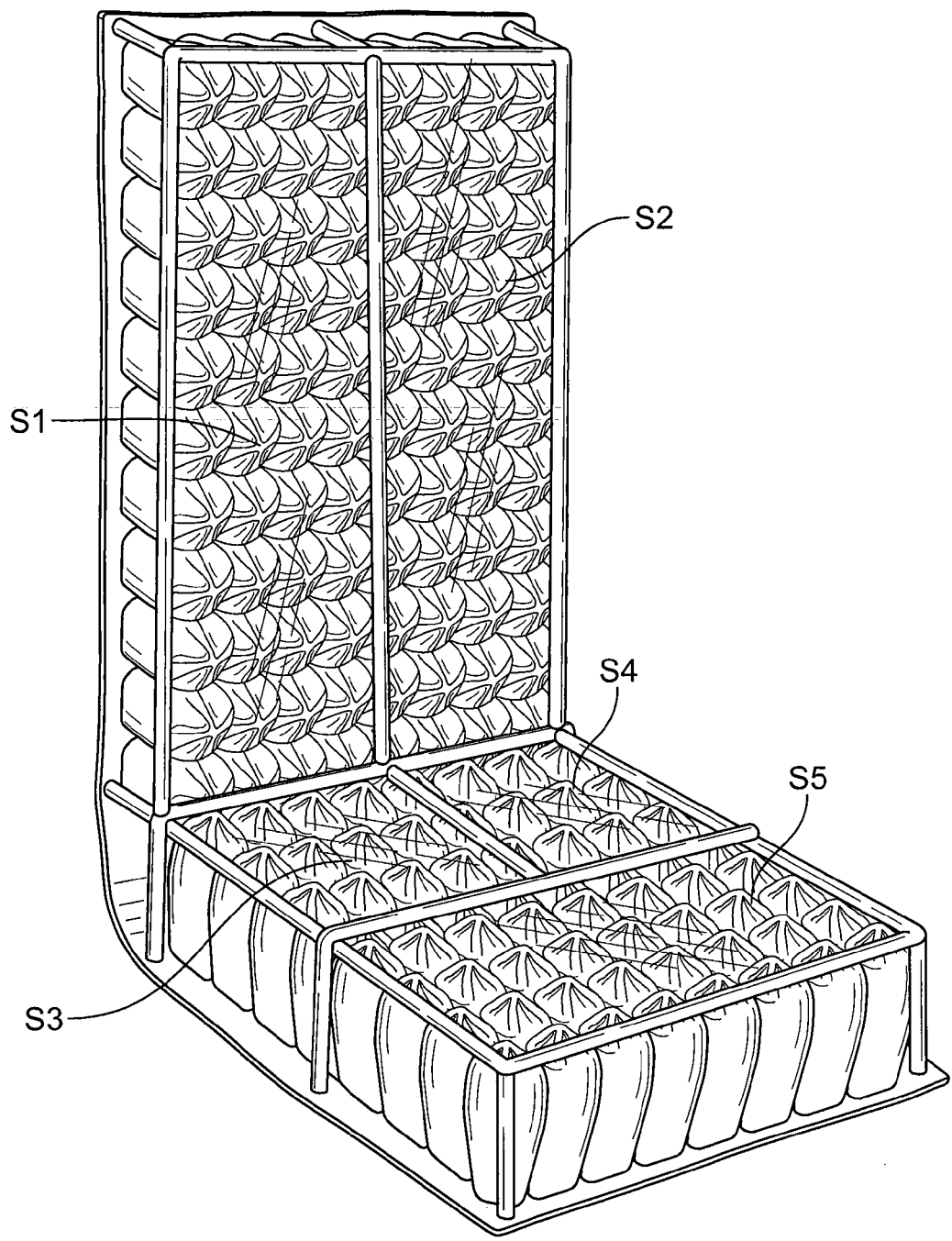
FIG. 5 is a perspective view of a seat configured with an adaptable surface and including several cylindrical subcushions.

FIG. 5 shows a different embodiment of the air-bladder-based adaptable cushion that utilizes the system of FIG. 1. The cushion includes several cylindrical air cushions of equal size arranged across the lower cushion and the back of a chair. In some embodiments, clusters of cylindrical air cushions are connected to the same air bladder. In such embodiments, the bottom of each cylindrical subcushion in the each cluster opens into a common base area shared by all subcushions in the air bladder unit. In such an arrangement, air is able to flow freely between the different cylindrical subcushions within the same air bladder unit. When a person sits on the cushion, the force exerted by the weight of the body may initially be greater on particular subcushions in a single cluster. As a result, the weight of the body forces air out of some subcushions and into other subcushions in the same cluster. The subcushions thereby passively adapt to the geometry of the seated person as a result of some of them partially deflating and some of them partially inflating in the same cluster without the use of the valves or air pumps discussed above. This configuration allows the surface to automatically adapt (e.g., "auto-contour") to the geometry of the object (e.g., the human body) placed on the surface regardless of its shape, thereby increasing the surface area of support (e.g., the human-surface interface).

The adaptable cushion shown in FIG. 5 is divided into five separate air bladder units (i.e., clusters of cylindrical subcushions). Two air bladders are located on the seat back S51, S52, two are positioned at the buttocks areas S53, S54, and the fifth air bladder is located at the thighs S55. A pressure distribution sensor 125 is utilized in the cushion of FIG. 5 to provide pressure distribution data in the same manner as described above. As discussed above in reference to FIG. 4, the controller monitors the maximum, minimum, and average forces exerted between the user and each air bladder unit (S51, S52, S53, S54, and S55) and opens and closes the corresponding valves to adapt the surface to the shape of the persons seated on the cushion.

In other embodiments, each cylindrical subcushion is a separate air bladder operated by a separate valve. The increased number and decreased size of the air bladders in such arrangements allow for a greater level of control and adaptability of the surface of the cushion. Although each cylindrical subcushion is controlled as a separate air bladder, in some embodiments, the subcushions are grouped into clusters to better allow the system to adapt to local prominences and to maintain a center of gravity and a predefined optimal pressure distribution, such as in the method of FIG. 6.

The controller 110 receives pressure distribution data from the pressure distribution sensor 125 (step 801). The controller then isolates data points associated with the cluster in question and identifies the average pressure amplitude for that cluster (step 803). The upper threshold is calculated by adding a first offset to the average pressure amplitude for the cluster and the lower threshold is calculated by subtracting a second offset (step 805). The value of the offset varies in different embodiments and may include, for example, a static value, a percentage of the average amplitude, or a value based on the standard deviation of pressure amplitudes in the cluster. The controller then identifies the maximum and minimum pressure amplitudes for a single air bladder (step 807) and compares those values to the maximum and minimum thresholds (steps 809 and 811). The controller then causes the valve to either release air from or pump air into the air bladder if necessary (steps 813 and 815). The controller continues to repeat these steps for each air bladder in the cluster (steps 817 and 819).

Figure 6:
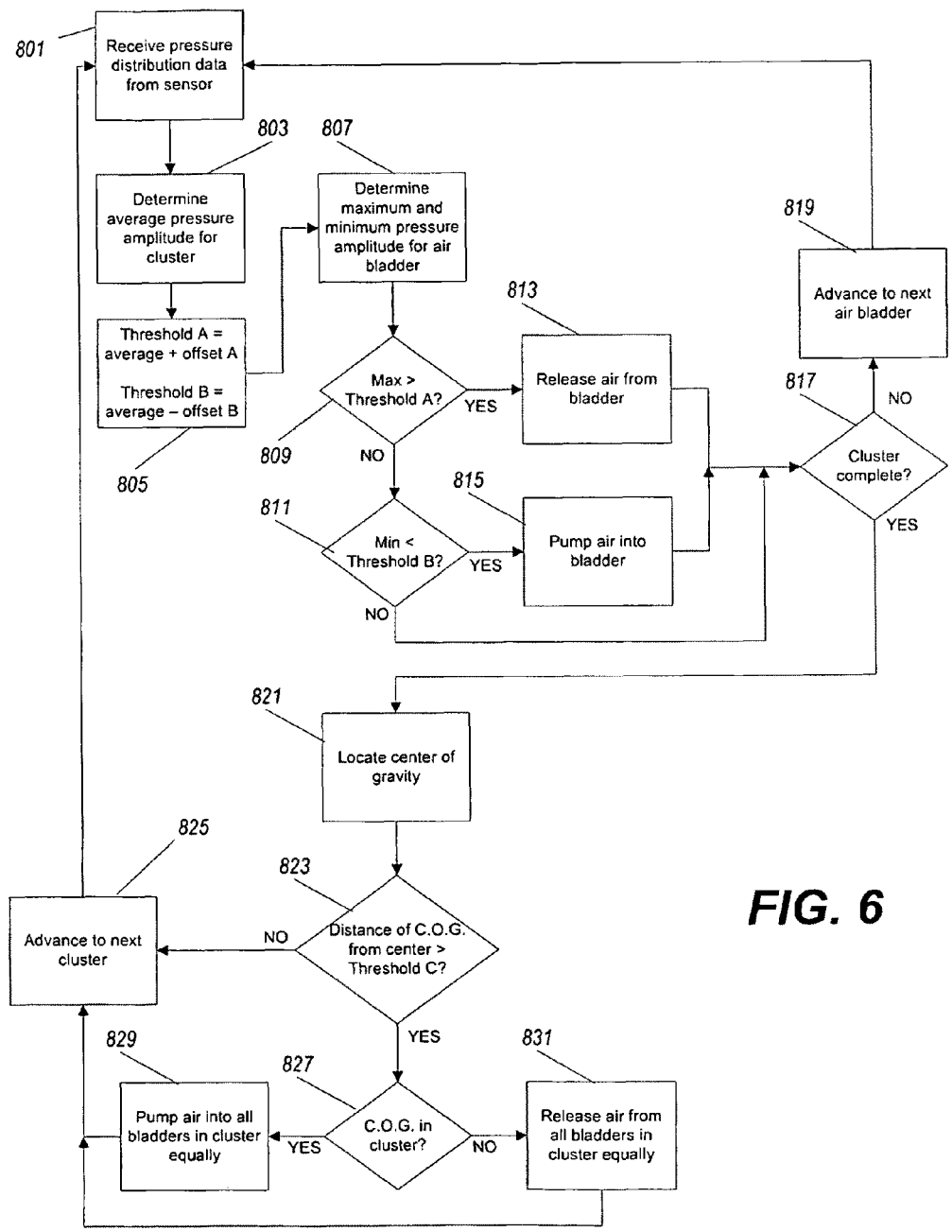
FIG. 6 is a flowchart of a process (carried out by the control unit) of adjusting the adaptable surface of FIG. 6 in response to measured pressure distribution data.

After adjusting all of the air bladders in a given cluster, the controller 110 locates the center of gravity (C.O.G.) on the cushion based on the data set from the pressure distribution sensor (step 821). If the center of gravity is within a given distance (threshold C) from the geometric center of the cushion (step 823), the controller proceeds to analyze the next cluster (step 825). However, if the distance between the center of gravity and the geometric center of the cushion is greater than the threshold, the controller adjusts the overall angle of the seat to reposition the center of gravity. In the method of FIG. 6, this is done by releasing air from or pumping air into every bladder in the cluster in an equal amount. If the center of gravity is located in the cluster (step 827), the cushion is angled away from the cluster by pumping an equal amount of air into every air bladder in the cluster (step 829). If the center of gravity is not located in the cluster, the cushion is angled toward the cluster by releasing an equal amount of air from every air bladder in the cluster (step 831). By adjusting all of the air bladders in the cluster in equal amounts, any adjustments made to adapt to the unique shape (e.g., bony prominences, muscle shape, etc.) of the user are maintained when the angle of the cushion is adjusted. In other embodiments, an additional mechanism (such as a secondary set of air bladders as discussed below) is used to adjust the angle of the cushion without changing the amount of air in the individual air bladders.

Figure 7:
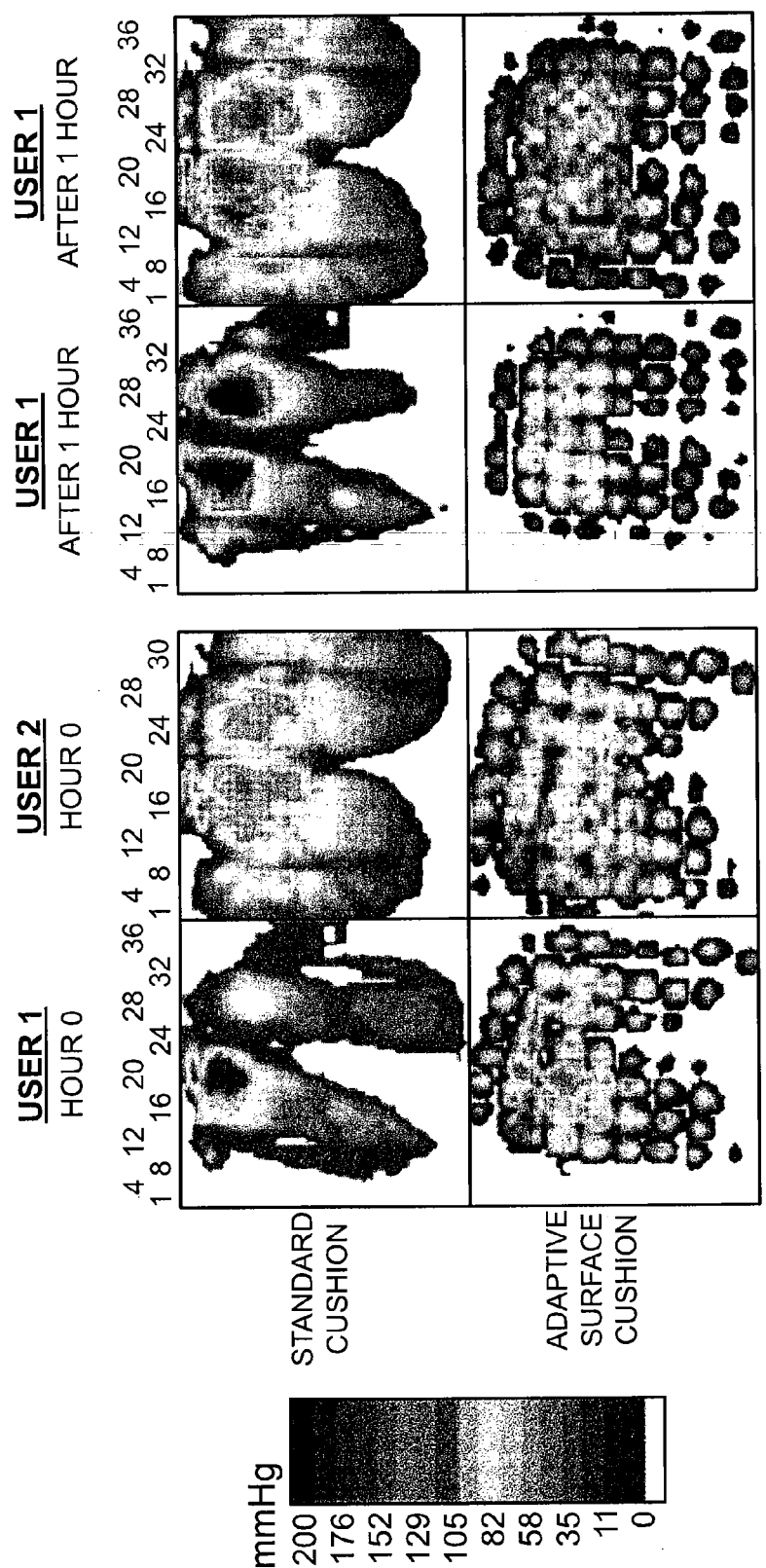
FIG. 7 is a graph of several sets of pressure distribution data received from a pressure distribution sensor showing the change in pressure distribution for two different users after sitting on two different seat cushions, including one seat cushion configured in accordance with the teachings of the invention.

FIG. 7 demonstrates the ability of the adaptable cushion according to FIG. 5 to distribute pressure according to the method of FIG. 6. The four data sets in the left block were captured from two different users immediately after sitting on a standard cushion (top row) and an adaptable surface cushion according to an embodiment of the present invention (bottom row). The four data sets in the right block were captured from the same two users after sitting on the cushions for one hour. Extreme maximum and minimum pressures are noticed immediately after the user sits on the standard cushion. The pressures continue to increase as time passes.

In contrast, the adaptable surface cushion begins to adjust to the user's unique body geometry shortly after the user sits on the cushion. Instead of experiencing localized areas of high pressure near bony prominences, the adaptable surface cushion evenly distributes pressure across the surface of the cushion. As time elapses, the cushion continues to adjust to the user's position and body weight. Therefore, even after one hour, the maximum measured pressure is relatively consistent across the surface of the cushion and is noticeably lower than the maximum pressure measured on the standard cushion.

Figure 8A:
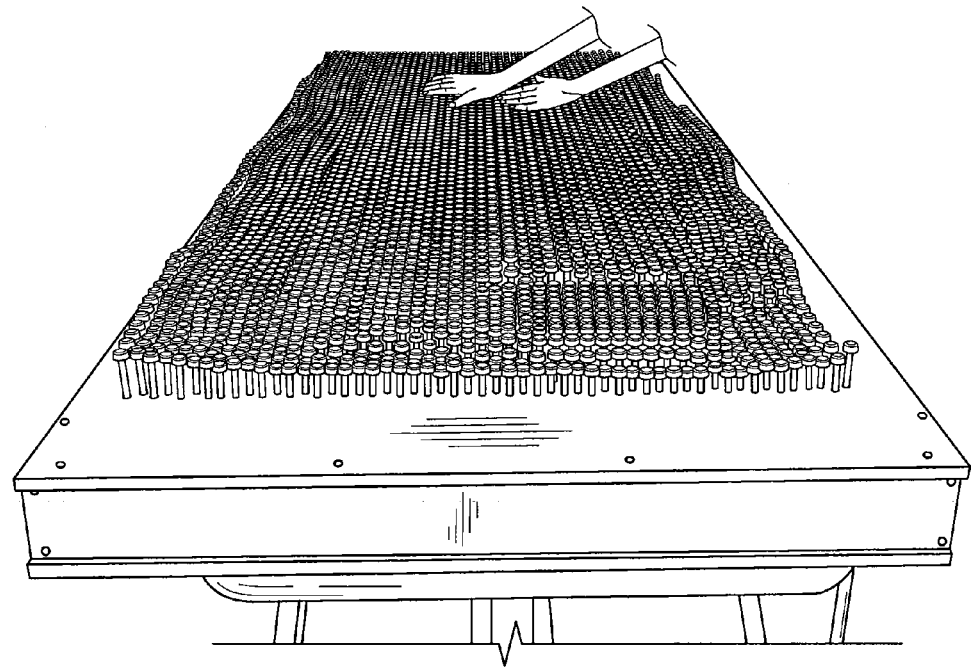
FIG. 8a is a perspective view of a bed equipped with the adaptable surface system according to one embodiment of the invention.
Figure 8B:
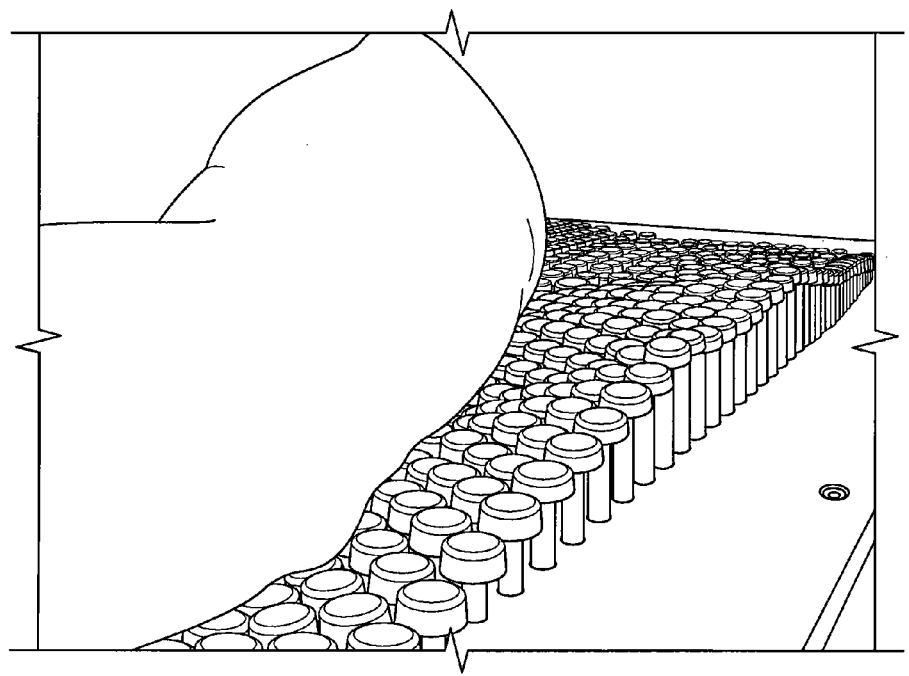
FIG. 8b is a perspective view of the bed of FIG. 8a adapting to the shape of a human body according to one embodiment.

FIGS. 8a and 8b illustrates another embodiment of an adaptable surface. In this example, the adaptable surface is a bed with several hundred pin elements that together support a user. Each pin element provides a surface of approximately 2 units/in$^2$ to contact and support the skin of a user's body. An equally high resolution pressure distribution array (such as the Tekscan sensor described above) is used to monitor the pressure distribution on each pin element. Alternatively, in some embodiments, the head of each pin element is fitted with one or more individual pressure sensors.

Figure 9:
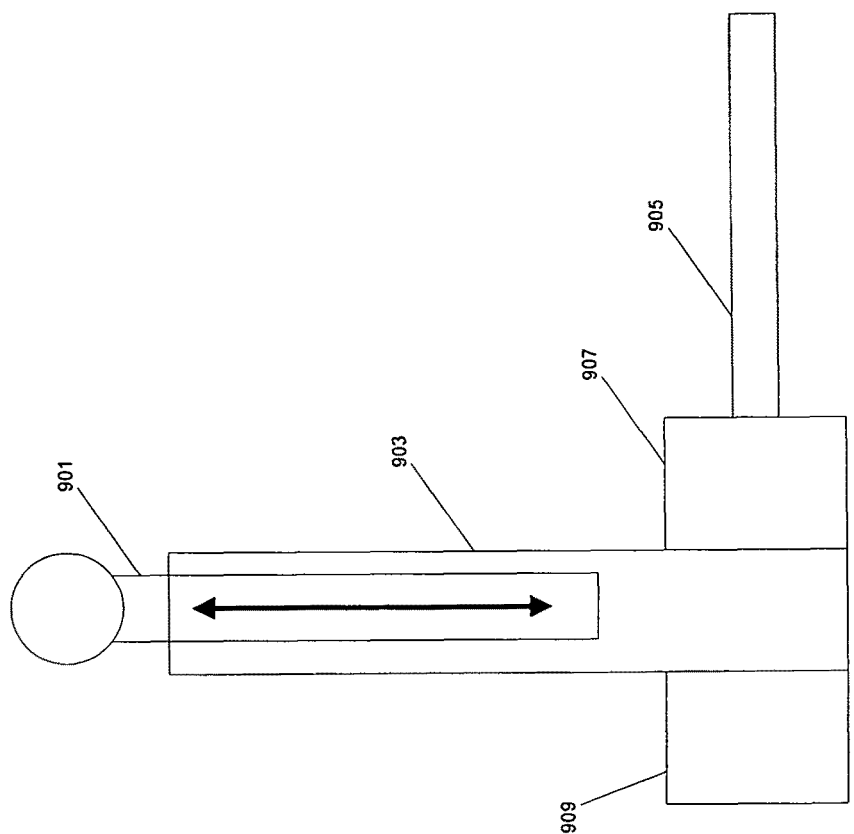
FIG. 9 is a side view of an adjustable pin element from an adaptable surface system such as the bed of FIG. 8.

In some embodiments of the bed in FIG. 8, each pin element is adjusted up or down independently based upon the pressure distribution measurement (such as discussed above in reference to FIGS. 4 and 6). Each pin element may be equipped with an independent linear motor for moving the pin up and down or with an independent pneumatic system. FIG. 9 illustrates an example of one such pneumatic pin element. The pin itself 901 is constructed of a soft plastic material with a relatively wide head that contacts the skin of the user. The stem of the pin extends into an air reservoir 903. Pressurized air is provided from the air pump through plastic tubing 905. A first valve 907 regulates whether pressurized air from the plastic tubing 905 is allowed to enter the air reservoir 903. A second valve 909 allows air to escape from the air reservoir 903.

In some embodiments, valve 907 is normally open. Valve 909 is also normally open, but allows air to escape at a slowed rate. As such, pressurized air keeps the air reservoir 903 full of pressurized air and forces the pin 901 into the highest position. If the pressure exerted on the pin 901 by a person lying on the bed is above the threshold, valve 907 is fully or partially closed to allow the air pressure in the air reservoir 903 to decrease. This causes pin 901 to be lowered into the air reservoir 903.

In other embodiments, air is not constantly pumped into the air reservoir 903. Instead, both valve 907 and valve 909 are normally closed. To raise the pin 901, valve 907 is opened and pressurized air enters the air reservoir 903. To lower the pin 901, valve 909 is opened and pressurized air is allowed to escape from the air reservoir 903.

Some embodiments also include a cut-off valve either incorporated into valve 907 or valve 909, or provided as a separate third valve. The cut-off valve is mechanically configured to release air when the internal air pressure exceeds a predefined level. This mechanical release valve provides a level of passive adaptability that immediately reacts to excessive forces without the controller operating the inlet and outlet valves.

Figure 10A:
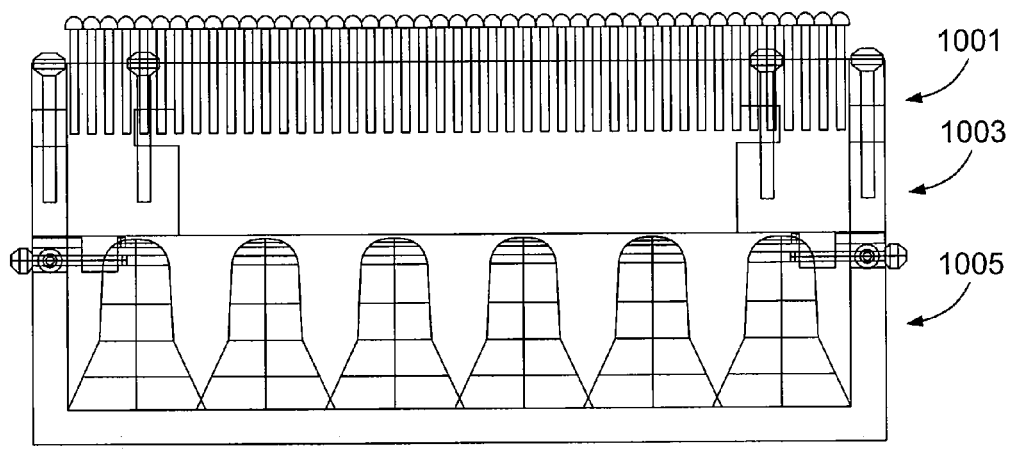
Figure 10B:
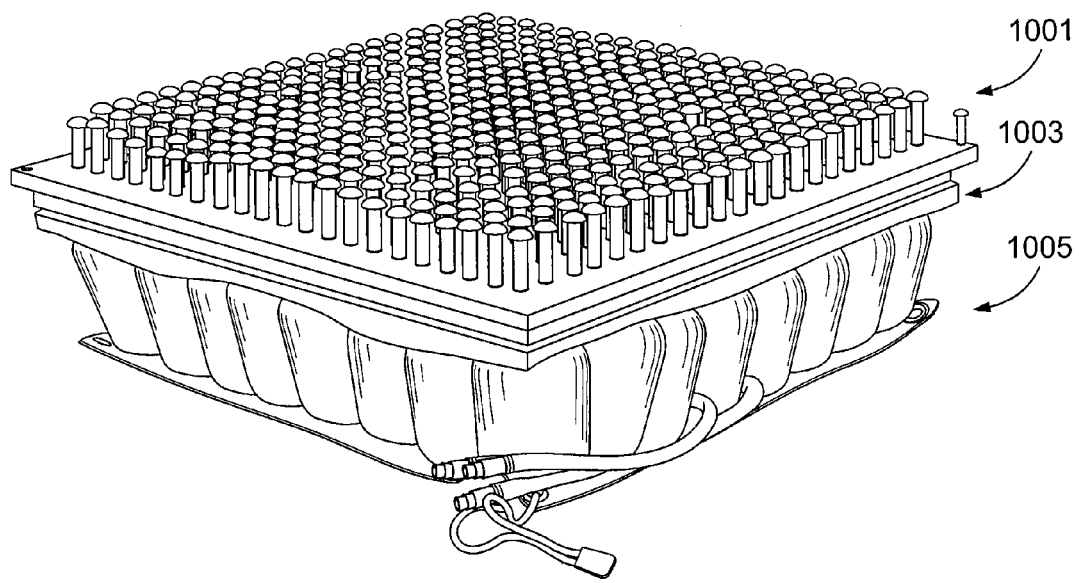

FIGS. 10a and 10b illustrate another embodiment of the pin-element-based adaptable bed surface of FIG. 8. The top layer of the surface includes subsets of pin elements 1001 attached to a common base 1003. Each pin element in a subset can either be independently adjustable or connected to a common air reservoir as discussed above. Beneath the base is a lower layer including one or more air bladders 1005. The one or more air bladders are partially inflated or partially deflated to raise and lower the subset of pins elements or to adjust the angle of the surface.

In some embodiments, the one or more air bladders provide active adjustment of the surface based on input from the pressure sensors, and the pin elements provide only passive adjustment. In such embodiments, no air is pumped into or released from the air reservoir of the top layer 1001. Instead, the weight of the user causes the pin elements to passively adapt to the geometry of the user's body and the air bladders raise or lower the subset of pin elements. In such embodiments, the reservoir can be filled with a fluid or gel substance to provide for smoother sliding of the pin elements into and out of the reservoir.

In some situations, such as in hospitals, it can be hazardous to move a person lying on the bed of FIGS. 8a and 8b. However, some conditions, including pressure ulcers, require that a patient be examined or treated on the side of the body that contacts the hospital bed. As such, some embodiments of the adaptable surface bed include a modular construction (i.e., sections of pins and/or air bladders operated independently of other sections). To allow a health care professional to access the back of a patient lying in the bed, one or more pin elements can be removed or lowered from underneath the bed allowing additional sensor or treatment instrumentation to be placed against the patient's back. Such instrumentation may include, for example, cameras, ultrasound sensors, and devices for drug delivery, skin temperature measurement, or blood flow analysis, and pulse oximeters.

Figure 11:
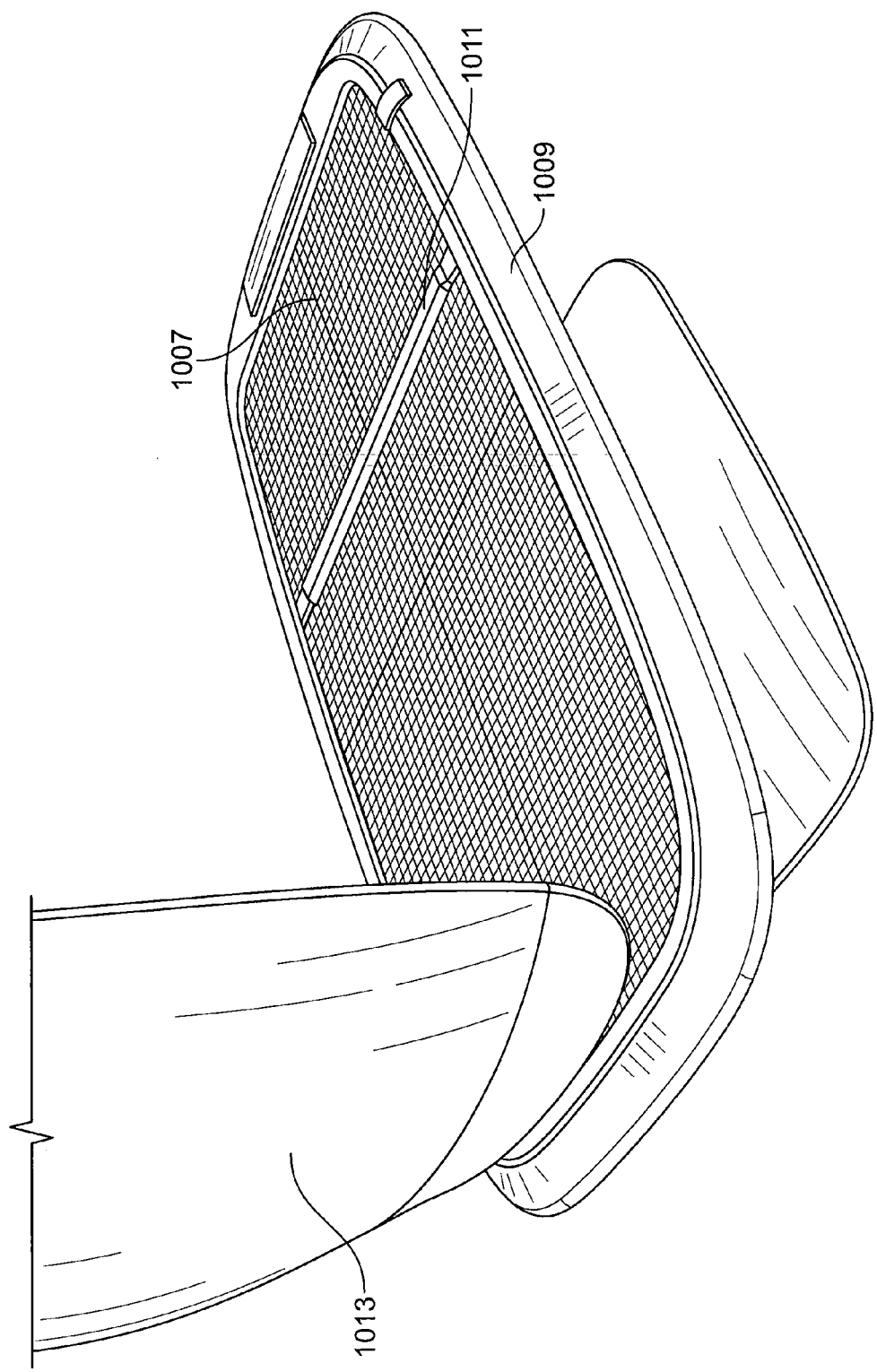
FIG. 11 is a perspective view of the bed of FIG. 8a with a sensor positioner and a cover.

FIG. 11 provides an example of a bed equipped with a sensor positioner for positioning a sensor between a patient and the bed surface without moving the patient. As illustrated in FIG. 11, an adjustable pin-based mattress 1007 is positioned within and supported by a bed frame housing 1009. Also attached to the bed frame housing 1009 is the sensor positioner 1011. The sensor position 1011 includes a bar that runs across the width of the mattress 1007 and is attached to the bed frame housing 1009. The sensor position 1011 includes one or more connectors for connecting a sensor or drug delivery device to the sensor positioner 1011.

The sensor positioner 1011 is connected to the bed frame housing at a position just below the top of the pin elements and is moved along the length of the mattress 1007 using motors housed within the bed frame housing 1009. The motor provide a signal to a controller indicating the position of the sensor positioner 1011 relative to the mattress 1007 and the direction in which the sensor positioner 1011 is moving. The controller then causes the pins on the mattress 1007 that are adjacent to the sensor positioner 1011 to lower slightly so that the sensor positioner 1011 can move over the top of the pins. Once the sensor positioner 1011 is on top of the pins of the mattress 1007, the fixed position of the sensors positioner 1011 relative to the bed frame housing 1009 causes pressure to be exerted by the sensor positioner 1011 on the pins of the mattress 1007. This pressure causes the pins to adjust to the height of the sensor positioner 1011 just as if a heavy object were placed on the pins of the mattress 1007. After the sensor positioner 1011 has moved past the pins, the pressure is relieved and the pins return to their normal position. Because the sensor positioner 1011 is positioned at a level below the surface of the pins, the patient does not feel any additional pressure caused by the moving device.

In addition to carrying sensors and drug delivery devices, the sensor positioner 1011 can be equipped with cleaning systems such as hot and cold water jets, outlets for soaps or other disinfectants, and air blowers. The attached cleaning systems can be used to clean the bed itself or to clean a patient lying on the bed without moving the patient. The bed frame housing 1009 in some embodiments, such as illustrated in FIG. 11, also includes a water-tight cover 1013. The cover 1013 is hingedly attached to the bed frame housing 1009 and lowers over the mattress 1007 in a clam-shell fashion. The cover 1013 can be lowered over an empty bed to clean the mattress 1007 or can be lowered over an occupied bed to clean the patient lying on the bed. When lowered over an occupied bed, the patient is either fitted with a breathing apparatus or the cover 1013 is configured to leave the patient's head uncovered. When in position, the water tight cover prevents liquids from the cleaning systems from escaping.

Figure 12:
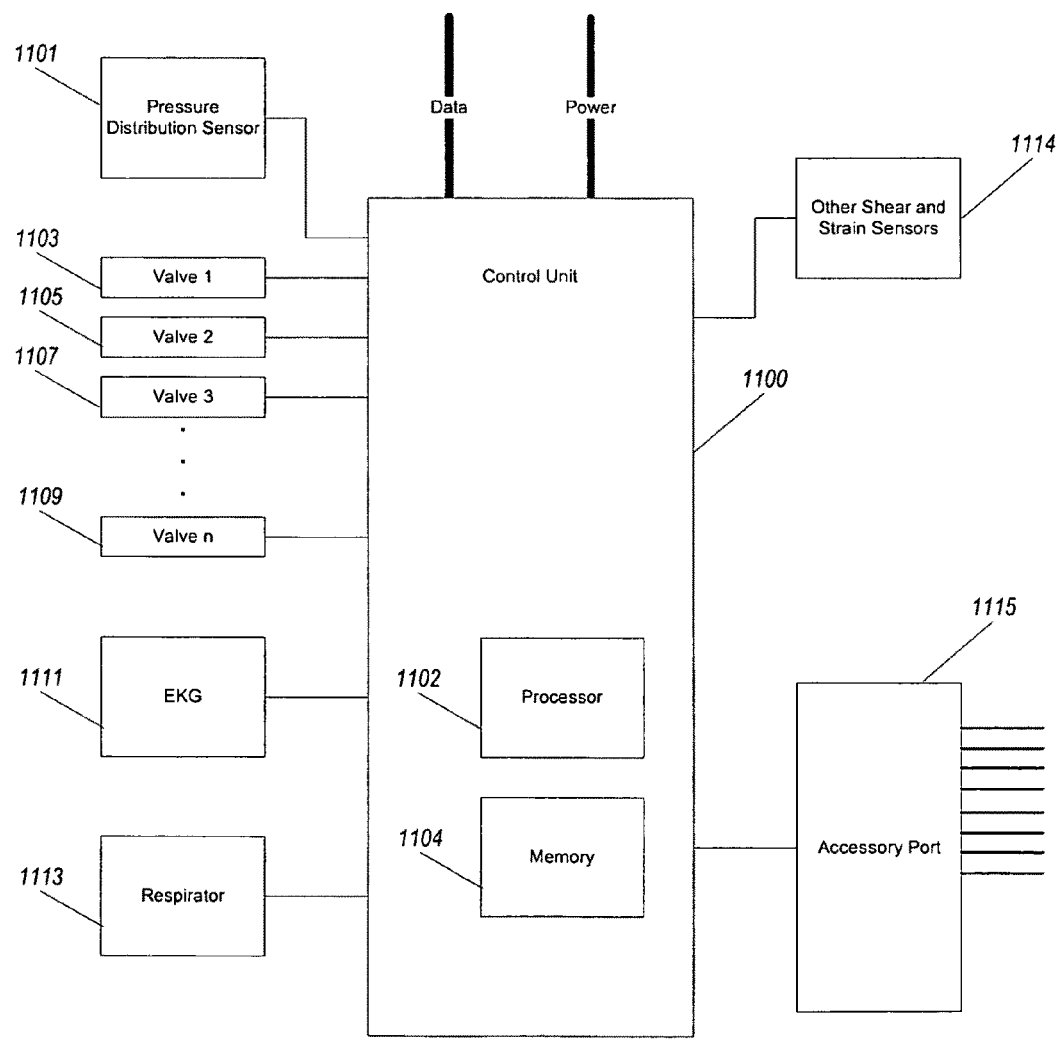
FIG. 12 is a block diagram of a control unit for an adaptable surface system.

In some embodiments, as shown in the block diagram of FIG. 12, a control unit provides power and communication functionality to the multiple monitoring and treatment devices in addition to monitoring and adjusting the pressure distribution on the adaptable surface. The control unit 1100 in FIG. 12 includes a processor 1102 and a computer-readable memory 1104. The control unit 1100 can be in the form of a unit designed specifically for use in the adaptable surface system or can be in the form of a desktop computer running a software application. The control unit 1100 receives data from the pressure distribution sensor 1101 and provides power and operating instructions to multiple air bladder valves or pin element motors 1103, 1105, 1107, 1109. The control unit 1100 is also connected to permanent treatment and monitoring equipment such as an EKG 1111, respirator 1113, and other strain/shear sensors 1114 that monitor a condition of a patient lying on the bed. The control unit 1100 is also connected to multiple-port accessory input 1115. Temporary devices, such as cameras, pulse oximeters, bacterial detectors and ultrasound probes, can be connected to an available accessory port when modularly attached to the adaptable surface of the hospital bed or when inserted into the sensor positioning system. In addition to providing power to these devices, the control unit facilitates one or two-way communication between the devices and external devices or networks (e.g., monitor screens, Hospital Information Systems (HIS), Picture archive and communications systems (PACS), etc.).

The constructions and methods described above are exemplary. Other configurations and designs are possible. For example, although the embodiments that include the layer of pin elements is discussed in the context of a hospital bed, an adaptable surface includes a layer of pin elements can be constructed as a seat cushion for a wheel chair, desk chair, vehicle seat, bicycle/motorcycle seat, or any other type of surface. Conversely, the embodiments described above that do not include a pin element layer are discussed as seat cushions, but can be constructed as a hospital bed or other surface (e.g., a bed comprising several air bladders that directly support and adapt to the user's body geometry). Various features and advantages of the invention are set forth in the following drawings and claims.

I claim:

1. An adaptable surface system comprising:
a surface including a plurality of individually adjustable subsurface units;
a plurality of subsurface pressure sensors, each pressure sensor of the plurality of subsurface pressure sensors corresponding to one of the plurality of individually adjustable subsurface units and positioned to measure an amount of pressure exerted upon the corresponding subsurface unit;
a controller including a processor and a computer readable memory storing computer instruction that, when executed by the processor, cause the controller to:

receive a first pressure value from a first subsurface pressure sensor of the plurality of subsurface pressure sensors, the first subsurface pressure sensor corresponding to a first subsurface unit,
compare the first pressure value to a threshold,
adjust a height of a first subsurface unit relative to the surface based upon the comparison of the first pressure value and the threshold,
receive a second pressure value from a second subsurface pressure sensor of the plurality of subsurface pressure sensors, the second subsurface pressure sensor corresponding to a second subsurface unit,
compare the second pressure value to the threshold, and
adjust a height of a second subsurface unit relative to the surface based upon the comparison of the second pressure value and the threshold; and
a sensor positioner, the sensor positioner being physically coupled to the surface and movable across the surface to exert a pressure on the surface such that, when the sensor positioner is positioned on the first substrate, the pressure is detected by the first substrate pressure sensor and the height of the first substrate is adjusted.

2. The adaptable surface system of claim 1, wherein the surface includes a vertical surface and the controller adjusts the height of the first subsurface unit by causing the first subsurface unit to move horizontally relative to the surface.

3. The adaptable surface system of claim 1 further comprising a bed, and wherein the surface includes a mattress of the bed.

4. The adaptable surface system of claim 1 further comprising an air pump, and wherein each of the plurality of subsurface units includes an inflatable bladder and a valve coupled to the air pump.

5. The adaptable surface system of claim 4, wherein the controller adjusts the height of the first subsurface unit by opening the valve of the first subsurface unit causing air from the air pump to inflate the inflatable bladder.

6. The adaptable surface system of claim 4, wherein the controller adjusts the height of the first subsurface unit by closing the valve of the first subsurface unit and preventing air from being pumped into the inflatable bladder.

7. The adaptable surface system of claim 1, wherein each of the plurality of subsurface units includes an inflatable bladder and a valve positioned to allow air to escape the inflatable bladder.

8. The adaptable surface system of claim 7, wherein the controller adjusts the height of the first subsurface unit by opening the valve and allowing air to escape from the inflatable bladder.

9. The adaptable surface system of claim 1, wherein each of the plurality of subsurface units includes a motor coupled to a pin, and wherein the controller adjusts the height of the first subsurface unit by causing the motor to change a position of the pin relative to the surface.

10. The adaptable surface system of claim 1, wherein the controller adjusts the height of the first subsurface unit based upon the comparison of the first pressure value and the threshold by lowering the height of the first subsurface unit if the first pressure value exceeds the threshold.

11. The adaptable surface system of claim 10, wherein the controller further calculates an adjustment value proportional to a difference between the first pressure value and the threshold and lowers the height of the first subsurface unit according to the adjustment value.

12. The adaptable surface system of claim 1, wherein, after adjusting the height of the first subsurface unit, the controller receives a second first pressure value from the first subsurface pressure sensor, compares the second first pressure value to the threshold, and adjusts the height of the first subsurface unit relative to the surface based upon the comparison of the second first pressure value and the threshold.

13. The adaptable surface system of claim 1, wherein the controller compares the first pressure value to a range of pressure values, the threshold being within the range, and wherein the controller does not change the height of the first subsurface unit when the first pressure value is within the range of pressure values.

14. The adaptable surface system of claim 1 further comprising a pressure sensor array wherein each of the plurality of subsurface pressure sensors includes one or more of the pressure sensors in the pressure sensor array.

15. The adaptable surface system of claim 1, wherein the plurality of subsurface units are modularly connected so that at least one of the plurality of subsurface units can be removed from the adaptable surface system while the controller continues to operate.

16. The adaptable surface system of claim 1, wherein the sensor positioner includes a sensor to measure a condition of a subject supported by the surface.

17. The adaptable surface system of claim 16, wherein the sensor positioner is configured to linearly move a sensor in a location between the surface and the subject supported by the surface from a first location to a second location.

18. The adaptable surface system of claim 1, wherein the sensor positioner extends linearly from a first edge of the surface to a second edge of the surface, wherein the pressure exerted by the sensor positioner on the surface is detected by a plurality of subsurface pressure sensors across a length of the sensor positioner, and wherein the height of each subsurface of the plurality of subsurfaces corresponding to the plurality of subsurface pressure sensors is adjusted.

19. The adaptable surface system of claim 1, further comprising a bed frame and wherein the sensor positioner is physically coupled to the bed frame.

20. An adaptable surface system comprising:

a surface including a plurality of individually adjustable subsurface units;

a plurality of subsurface pressure sensors, each pressure sensor of the plurality of subsurface pressure sensors corresponding to one of the plurality of individually adjustable subsurface units and positioned to measure an amount of pressure exerted upon the corresponding subsurface unit;

a controller including a processor and a computer readable memory storing computer instruction that, when executed by the processor, cause the controller to:

receive a first pressure value from a first subsurface pressure sensor of the plurality of subsurface pressure sensors, the first subsurface pressure sensor corresponding to a first subsurface unit, compare the first pressure value to a threshold, adjust a height of a first subsurface unit relative to the surface based upon the comparison of the first pressure value and the threshold, receive a second pressure value from a second subsurface pressure sensor of the plurality of subsurface pressure sensors, the second subsurface pressure sensor corresponding to a second subsurface unit, compare the second pressure value to the threshold, and adjust a height of a second subsurface unit relative to the surface based upon the comparison of the second pressure value and the threshold; and a sensor positioner extending linearly from a first edge of the surface to a second edge of the surface, the sensor positioner being coupled to a first mechanism at the first edge of the surface and coupled to a second mechanism at the second edge of the surface, and being movable across the surface, based upon the instructions executed by the processor, to exert a pressure on the surface such that when the sensor positioner is positioned on the first subsurface, the pressure is detected by a plurality of subsurface pressure sensors across the length of the sensor positioner, and the height of each subsurface of the plurality of subsurfaces corresponding to the plurality of subsurface pressure sensors is adjusted.

21. The adaptable surface system of claim 20, wherein the sensor positioner is coupled to the first mechanism and the second mechanism at a fixed height relative to the adaptable surface system, and wherein the pressure exerted by the sensor positioner on the subsequent subsurface pressure sensor as the sensor positioner is moved along the surface is caused by the coupling of the sensor positioner to the first mechanism and the second mechanism at the fixed height.

* * * * *